United States Patent [19]

Marshall

[11] Patent Number: 5,005,438
[45] Date of Patent: Apr. 9, 1991

[54] SHIFT MECHANISM

[76] Inventor: Ernest H. Marshall, 30 Saulters Rd., Manchester, Conn. 06040

[21] Appl. No.: 542,973

[22] Filed: Jun. 25, 1990

Related U.S. Application Data

[62] Division of Ser. No. 273,474, Nov. 21, 1988.

[51] Int. Cl.⁵ .............................................. G05G 5/06
[52] U.S. Cl. ...................................... 74/538; 74/536; 74/535; 74/475
[58] Field of Search ...................... 74/475, 502.2, 535, 74/536, 537, 538

[56] References Cited

U.S. PATENT DOCUMENTS

| | | | |
|---|---|---|---|
| 616,925 | 1/1899 | Heller | 74/537 |
| 890,964 | 6/1908 | Coffin | 74/538 |
| 1,622,530 | 3/1927 | Miller | 74/537 |
| 1,974,973 | 9/1934 | Paul | 74/538 |

Primary Examiner—Dirk Wright
Attorney, Agent, or Firm—CTC & Associates

[57] ABSTRACT

A multi-speed transmission has particular usefulness in bicycles, completely eliminating the use of the commonly used derailleur and the exposed flexible cable and the readjustment problems inherent with that prior structure. The transmission includes separate concentric gear rings which to a certain extent operate independently of each other. A shift mechanism for shifting the transmission is such the transmission can not be shifted from one gear to a non-adjacent gear without stopping at a gear therebetween. That is, no gear can be skipped. This is accomplished by a particular relationship of a pawl, a pusher, a shift segment plate and barrels mounted on the shift segment plate, among other parts.

2 Claims, 9 Drawing Sheets

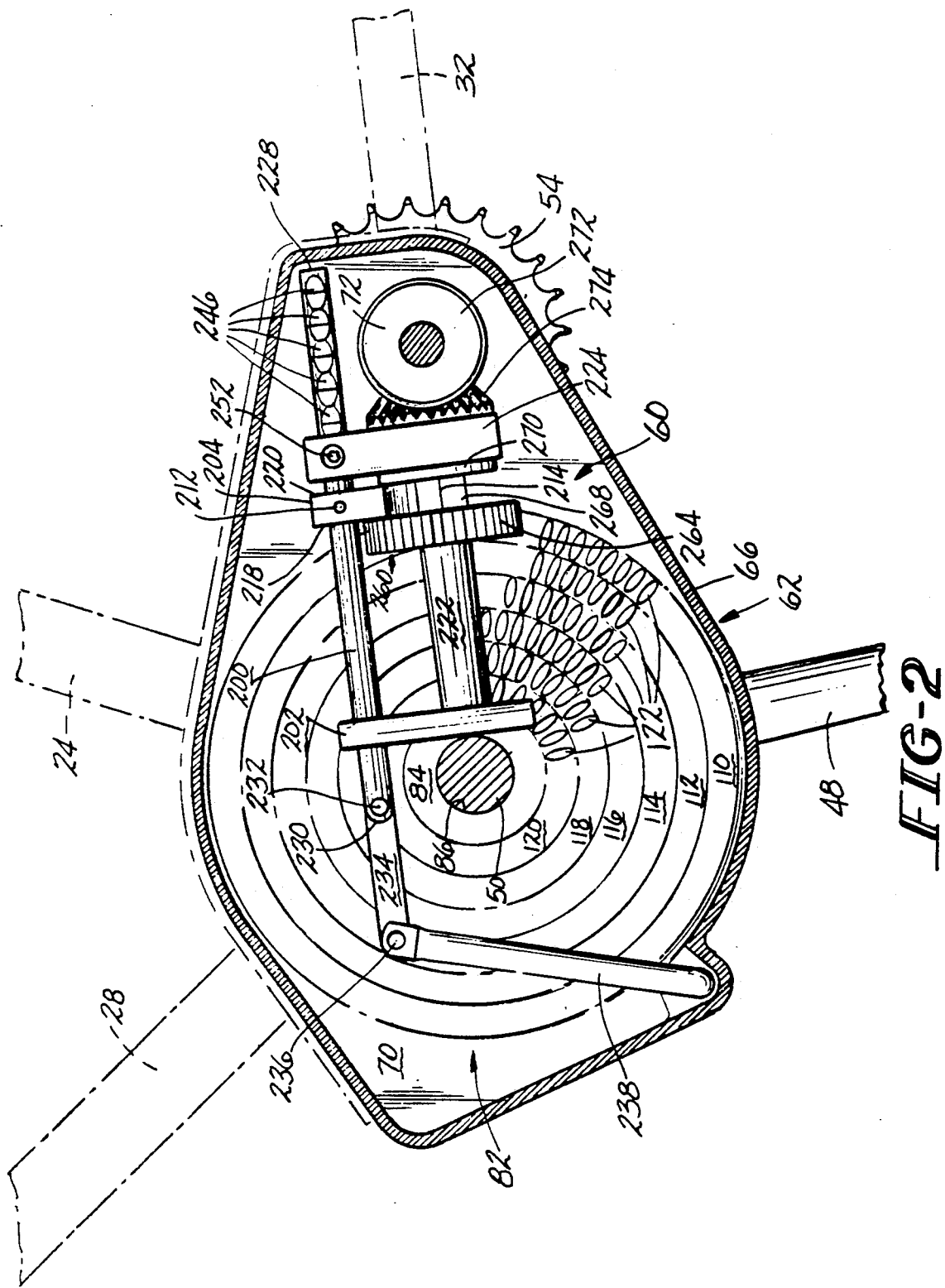

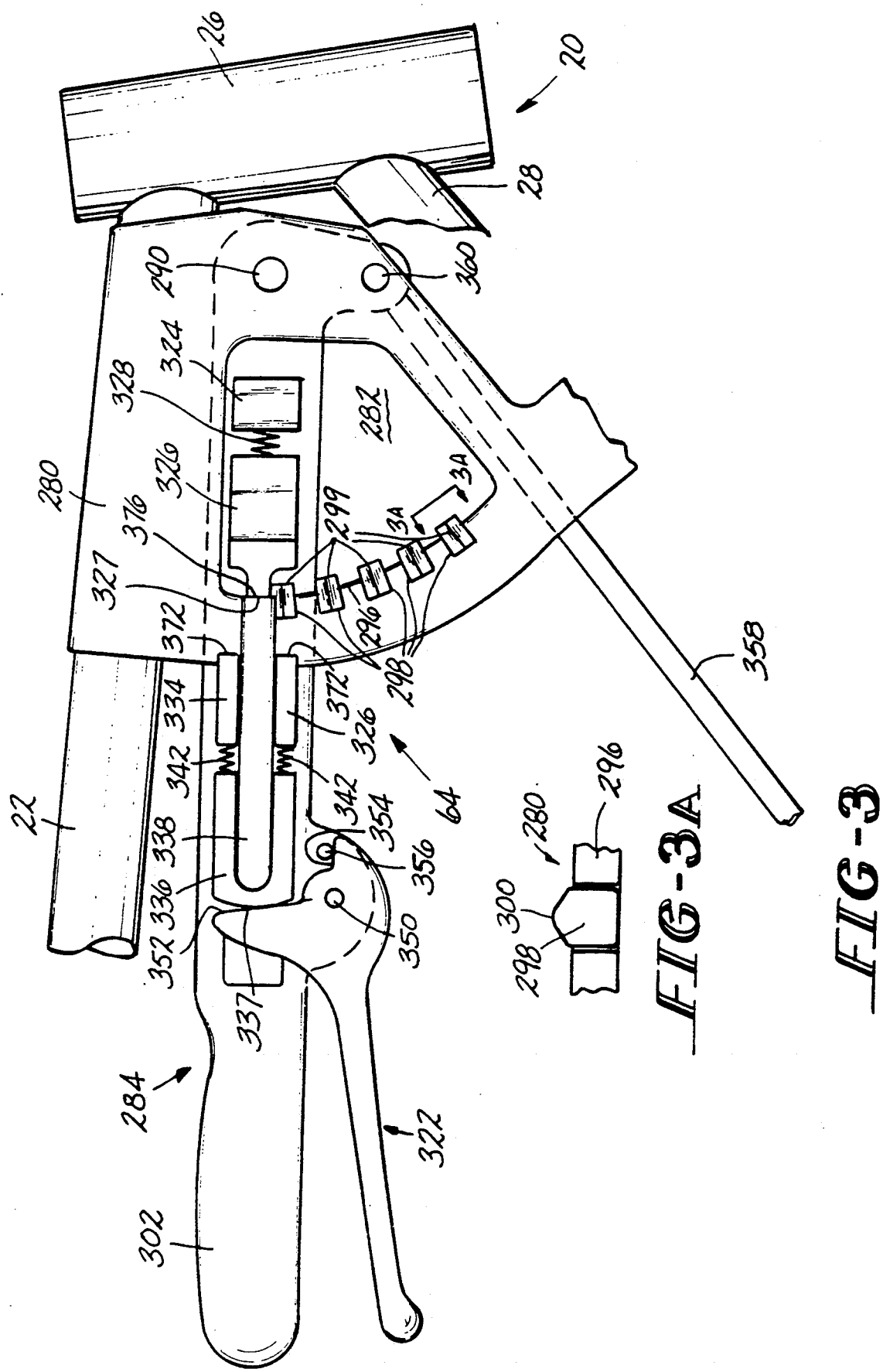

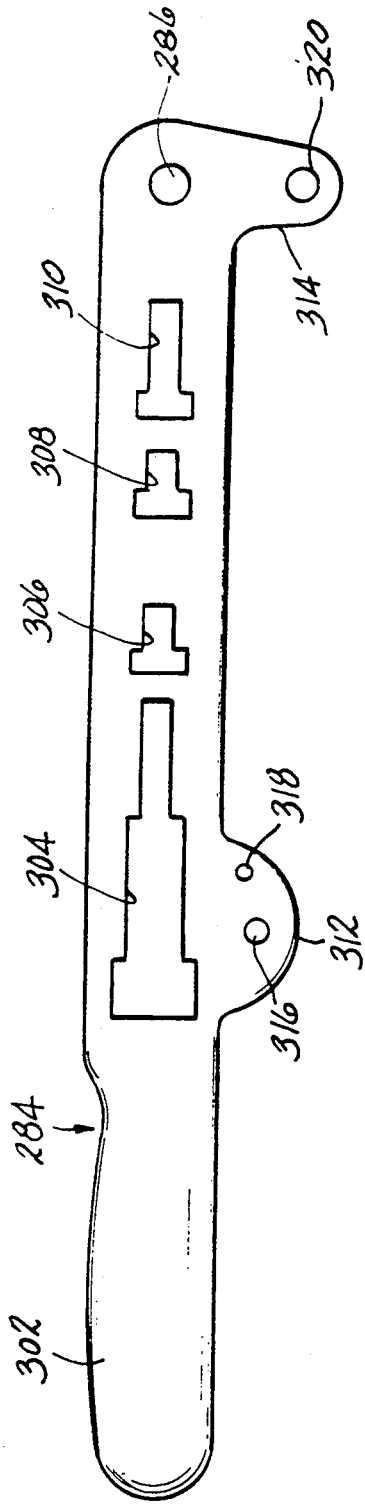
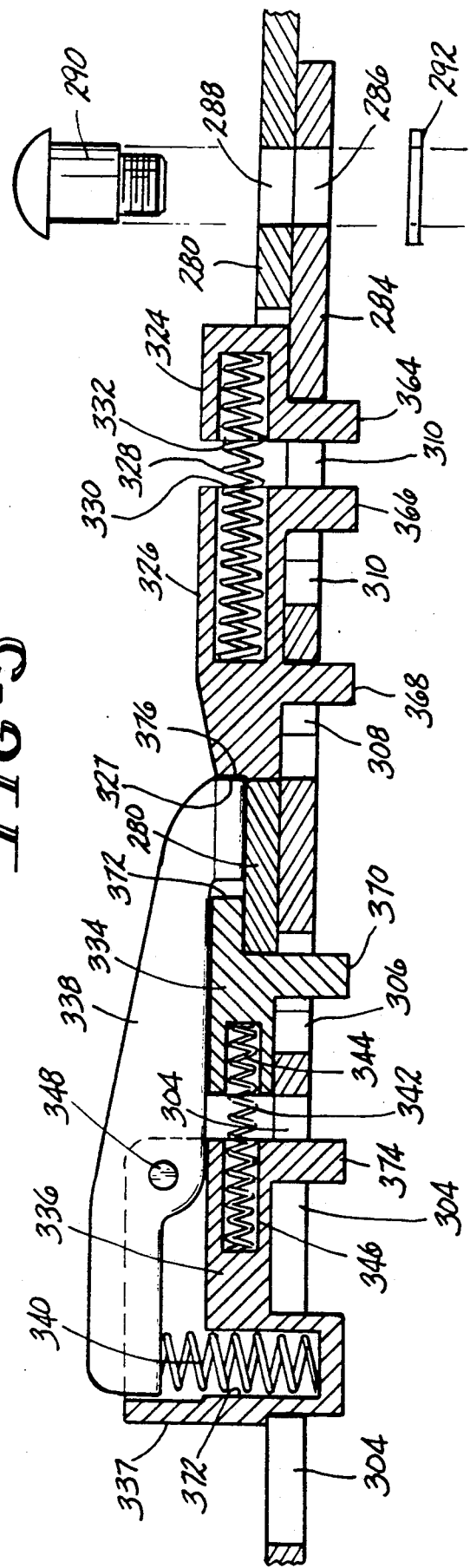
FIG-5
FIG-4

SHIFT MECHANISM

This is a divisional of application Ser. No. 273,474, filed Nov. 21, 1988.

BACKGROUND OF THE INVENTION

The present invention relates to a transmission and a shift mechanism for operating a transmission such as the inventive transmission. The invention will be described in connection with its use on a multi-speed bicycle, but its utility is not so limited.

It is known and common for transmissions for multi-speed bicycles to make use of a rear and main sprocket derailleur, the transmission when shifted disengaging a chain from one sprocket and engaging it with another. This requires a mechanism that will lift a chain and drop it into engagement with a larger or smaller sprocket, designedly but not necessarily the next larger or smaller sprocket. Operation of the prior art transmission is by an exposed or outside flexible cable which easily and constantly gets out of adjustment.

It is therefore an important object of the present invention to provide a transmission which completely eliminates the use of outside cables.

Another important object of the invention is to provide such a transmission which includes a housing in which all moving parts are totally enclosed.

A still further object of the invention is to provide such a transmission in which nothing can go out of adjustment.

An additional object of the invention is to provide such a transmission which eliminates the need for caliper brakes and enables a reversion to the old tried and true coaster brake hub on the rear bicycle wheel.

Yet another object of the invention is to provide an improved shift mechanism for use in operating the inventive transmission.

A still further object to the invention is to provide a shift mechanism which is such that in the shifting process, no gear can be skipped. For example, one can not go from first gear to third gear without stopping in second gear. This is a safety feature which prevents damage to the gears through jamming.

Further objects are to provide a transmission device and a shift mechanism which are relatively simple and economical in construction.

Additional objects and advantages will appear hereinafter.

SUMMARY OF THE INVENTION

A transmission embodying the invention transmits rotary motion from an input shaft to an output location. The transmission, which comprises an output shaft at the output location, also has a compound face gear assembly including a back plate having an axis and rotatable with the input shaft about the axis. The back plate has radially inner and outer arcuate openings therethrough centered on the axis and radially innermost and outer circumferentially continuous gear rings providing a first gear and a second gear, respectively. The radially outer gear ring surrounds and is contiguous with the innermost gear ring. Each gear ring has on the entirety of one face radial gear teeth and on the opposite face a lug. The gear teeth, which are somewhat elliptical, are all of the same pitch. The lugs of the innermost and outer gear rings extend through the inner and outer arcuate openings, respectively, and each gear ring is independently rotatable a limited circumferential distance relative to the back plate as determined by the difference in circumferential extent between its lug and its associated arcuate opening. Resilient means urge each lug toward a neutral central position spaced from each end of its associated arcuate opening. The transmission further has means for transmitting rotation from the input shaft to the gear teeth of a selected one of the gear rings and thence to the output shaft, and means for changing the selected one of the gear rings engaged by the transmitting means.

The rotation transmitting means comprises a sliding pinion having external gear teeth which are somewhat elliptical and are engageable with the gear teeth of any gear ring, and a spline shaft which is perpendicular to the output shaft and on which the sliding pinion is slidably mounted. Thus, the sliding pinion and the spline shaft are rotatable by whatever gear ring is in engagement with the sliding pinion. The rotation transmitting means also includes a first bevel gear mounted on an end of the spline shaft and meshing with a second bevel gear which is mounted on the output shaft.

The sliding pinion has an external circumferential groove and the means for changing the engaged gear ring includes a shift rod parallel to the spline shaft, a yoke immovably mounted on the shift rod and engaging the external circumferential groove of the sliding pinion, the shift rod being movable lengthwise of itself to move the yoke, causing the yoke to move the sliding pinion perpendicular to the axis of the back plate. The means for changing the engaged gear ring further includes an inner actuator, a link pivotally connected to the shift rod and to the inner actuator, and an external actuator.

The transmission is disclosed as also having third, fourth, fifth and sixth gear rings. The sixth gear ring provides the disclosed transmission with an outermost gear ring. Thus, the disclosed transmission is a six-speed transmission.

The invention further includes a shift mechanism for manipulating an actuator of a transmission having a second gear between a first gear and a third gear to shift the transmission from any of the gears to an adjacent gear. The shift mechanism comprises a fixedly mountable shift segment plate, a shift arm pivotally mounted about a main axis which is fixed with respect to the shift segment plate and providing an additional axis parallel to the main axis. A shift rod is pivotally connectible to the transmission actuator and is pivotally connected to the shift arm at the additional axis. The shift segment plate has an arcuate surface confronting and coaxial with the main axis, a plurality of like barrels spaced from each other and having free ends projecting toward the main axis from the arcuate surface and crests projecting upwardly from the shift segment plate. The barrels include one barrel which is adjacent and spaced from one end of the arcuate surface and another barrel which is adjacent and spaced from the other end of the arcuate surface, whereby each barrel has a portion of said arcuate surface on each side thereof. The shift mechanism further comprises a shift lever pivotally mounted with respect to the shift arm and having a forwardly facing surface overlying the shift arm and generally facing the shift segment plate. A pawl is mounted for limited movement lengthwise of the shift arm and has a trailing end of width sufficiently narrow to fit between the free ends of adjacent ones of the barrels and between the free end of said barrel which is adjacent the one end of the arcuate surface and between the free end of the barrel which is adjacent the other end of the arcuate surface. Spring means urge the pawl away from the main axis. A pusher block is mounted for limited movement lengthwise of the shift arm and having a trailing end. Pusher block resilient means urge the pusher block against the forwardly facing surface of the shift lever. A pusher is carried by the pusher block and is movable therewith lengthwise of the shift arm and having a forward end confronting the main axis and engageable with the pawl. The pusher is pivotally mounted to the pusher block about a pusher axis perpendicular to the main axis, and resilient means urge rotation of the pusher about the pusher axis in the direction urging the forward end of the pusher toward the shift segment plate. The forward end of the pusher is engageable in abutting fashion with the trailing end of the pawl and with the shift segment plate and is liftable away from the shift segment plate by passing over the crest of any barrel during shifting and into overlapping engagement with the trailing end of the pawl. This permits the trailing end of the pawl to engage the arcuate surface and prevents further shifting until the shift lever is released to allow the pusher block resilient means to push the pusher block and the pusher away from the main axis to move the forward end of the pusher past the trailing end of the pawl and the resilient means which urge rotation of the pusher to move the forward end of the pusher into engagement with the shift segment plate and abutting relationship with the trailing end of the pawl.

DESCRIPTION OF THE DRAWINGS

FIG. 2 is an enlarged cutaway left side view of the transmission of FIG. 1, with the parts in the sixth speed position;

FIG. 3 is an enlarged partly broken away right side elevation of the shift mechanism, with the shift mechanism shown in the sixth speed position;

FIG. 3A is an enlarged fragmentary view on line 3A—3A of FIG. 3;

FIG. 4 is an enlarged partly fragmentary cross section of certain components of the shift mechanism;

FIG. 5 is a side elevation of a shift arm which is a component of the shift mechanism;

DESCRIPTION OF THE INVENTION

Figure 1:
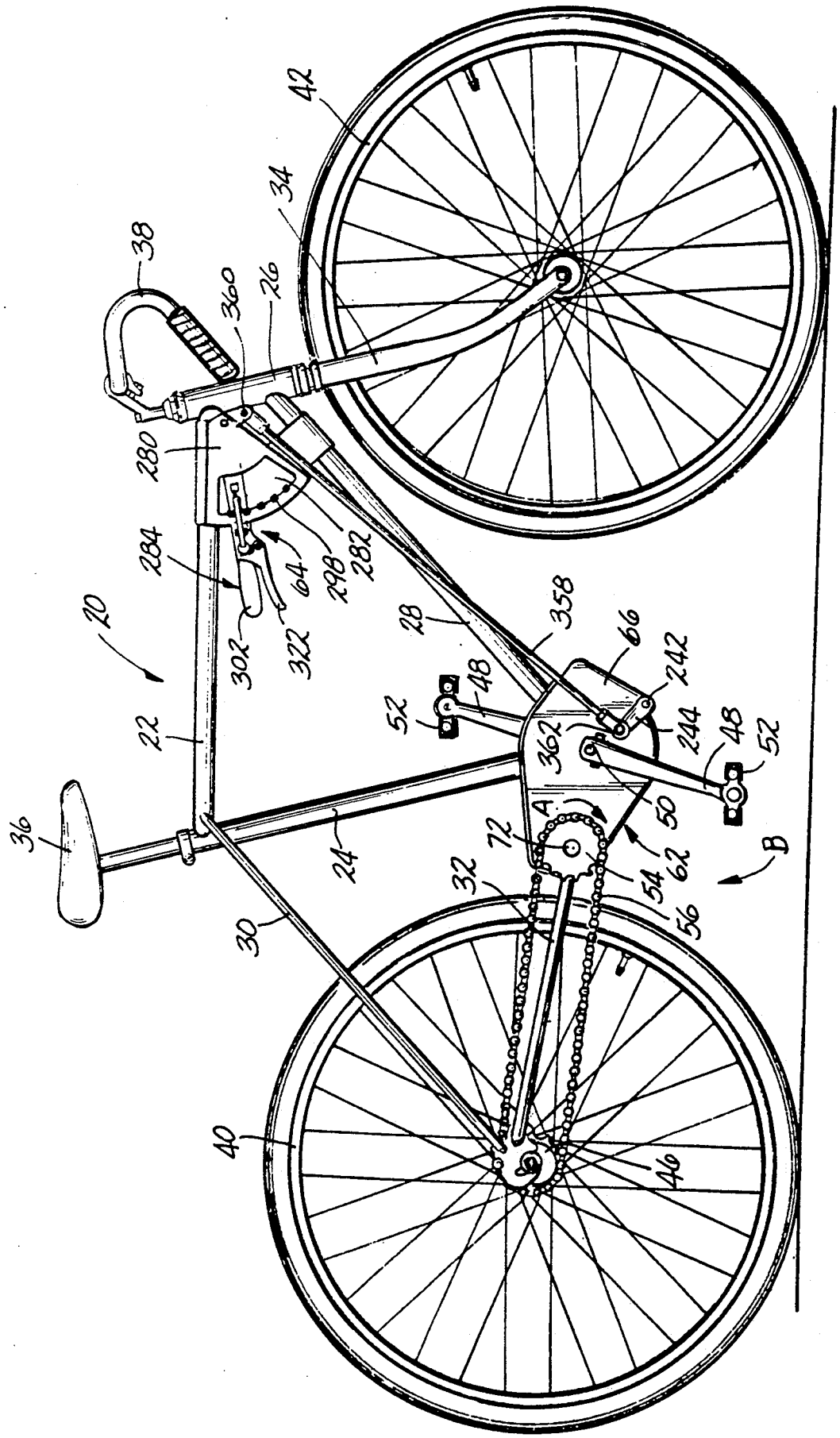
FIG. 1 is a right side elevation of a bicycle equipped with the inventive transmission and the inventive shift mechanism, with the parts in the fifth speed position.

The invention will be described as applied to a multi-speed bicycle 20 which is shown in right side elevation in FIG. 1. Bicycle 20 comprises a frame which includes a horizontal frame member 22, a rear stem 24, a front stem 26, a diagonal frame member 28, a rear upper fork 30, a rear lower fork 32 and a front fork 34. Bicycle 20 also comprises a seat 36, a handlebar 38, a rear wheel 40 secured to the lower end of rear upper fork 30 and to the rearward end of rear lower fork 32, and a front wheel 42 secured to the lower end of front fork 34. Rear wheel 40 has a coaster brake hub 44 and a sprocket 46 is coaxial and rotatable with rear wheel 40.

Bicycle 20 further includes a pair of crank arms 48 which are rigidly secured to opposite ends of a horizontal shaft 50 and which extend in opposite radial directions therefrom. Pedals 52 are affixed to the radially outer ends of crank arms 48. Shaft 50 is an input shaft which is rotatable by torque applied to pedals 52.

Bicycle 20 additionally comprises a sprocket 54 which is located between shaft 50 and hub 44 and a chain 56 passes over and engages sprockets 46 and 54, whereby rotation of sprocket 54 in the driving direction, indicated by arrow A in FIG. 1, causes movement of chain 56 and rotation of sprocket 46, and with it rotation of wheel 40 in the same direction.

Torque applied to sprocket 54 in the anti-driving direction, i.e., the direction opposite that indicated by arrow A in FIG. 1, will activate coaster brake hub 44, to stop or prevent rotation of rear wheel 40.

Bicycle 20 also is provided with a special transmission 60, which is located almost entirely within a housing 62, and a special shift mechanism 64 for actuating transmission 60. Transmission 60 is detailed in FIGS. 2 and 6–15, and shift mechanism 64 is detailed in FIGS. 1, 3, 3A, 4 and 5.

Figure 6:
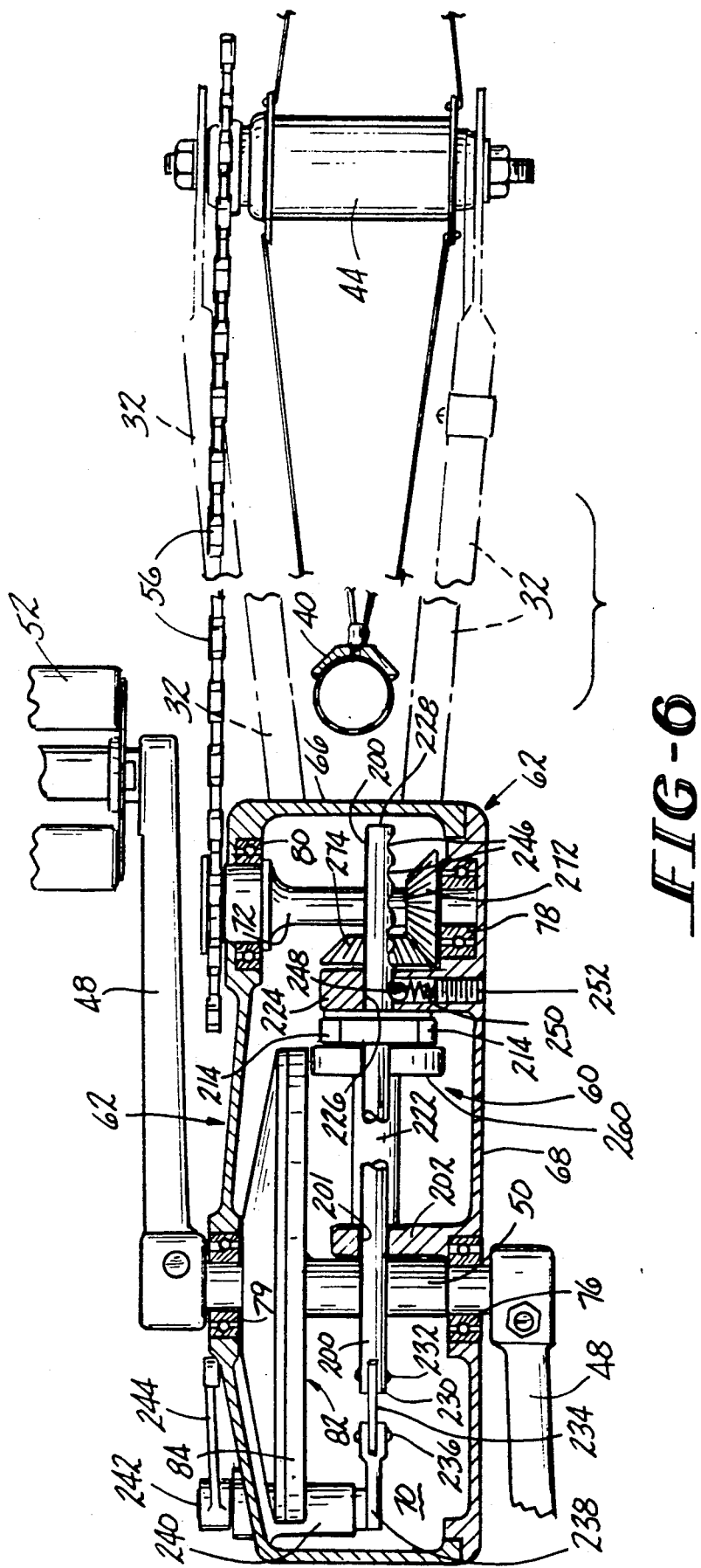
FIG. 6 is a cutaway top view of the transmission, showing the drive sprocket, chain and rear wheel, with the parts in the sixth speed position.

Housing 62 is in fixed position with respect to the frame of bicycle 20 and is made up of a deep body member 66 and a plate-like cover member 68 closing member 66 and forming therewith a chamber 70 best seen in FIGS. 2 and 6. Member 66 is fixedly joined, as by welding, to rear stem 24, diagonal frame member 28 and rear lower fork 32.

As stated above, sprocket 54, when rotated in the driving direction indicated by arrow A in FIG. 1, drives rear wheel 40 to propel bicycle 20 in a forward direction. Transmission 60 provides an intermediary between crank arms 48 and sprocket 54 for accomplishing that end, when crank arms 48 are rotated in the direction indicated by arrow B in FIG. 1. When torque is applied to crank arms 48 in the direction opposite that indicated by arrow B, coaster brake hub 44 is activated.

Sprocket 54 is rigidly mounted on an output shaft 72 which is parallel to shaft 50. Shaft 72 will be deemed an element of transmission 60. Except for their ends, shafts 50 and 72 are entirely within housing 62.

Transmission 60 is shiftable into any of six speed positions, so that bicycle 20 is a six-speed bicycle, but the invention is not limited to a six-speed bicycle, or to any bicycle.

The ends of shaft 50 extend outwardly of housing 62 through ball bearings 79 and 76 which are mounted in the walls of body member 66 and cover member 68, respectively. As also shown in FIG. 6, one end of shaft 72 is mounted in a ball bearing 78 in a recess in cover member 68 and the other end of shaft 72 passes through the wall of body member 66 where it is mounted in a ball bearing 80, and sprocket 54 is rigidly mounted on the last-mentioned end of shaft 72, as aforesaid.

The construction of transmission 60 will be described initially with particular reference to FIGS. 2 and 6. As stated, FIG. 2 is an enlarged cutaway left side view of transmission 60, shown in the sixth speed position, and FIG. 6 is a cutaway top view of transmission 60.

Figure 7:
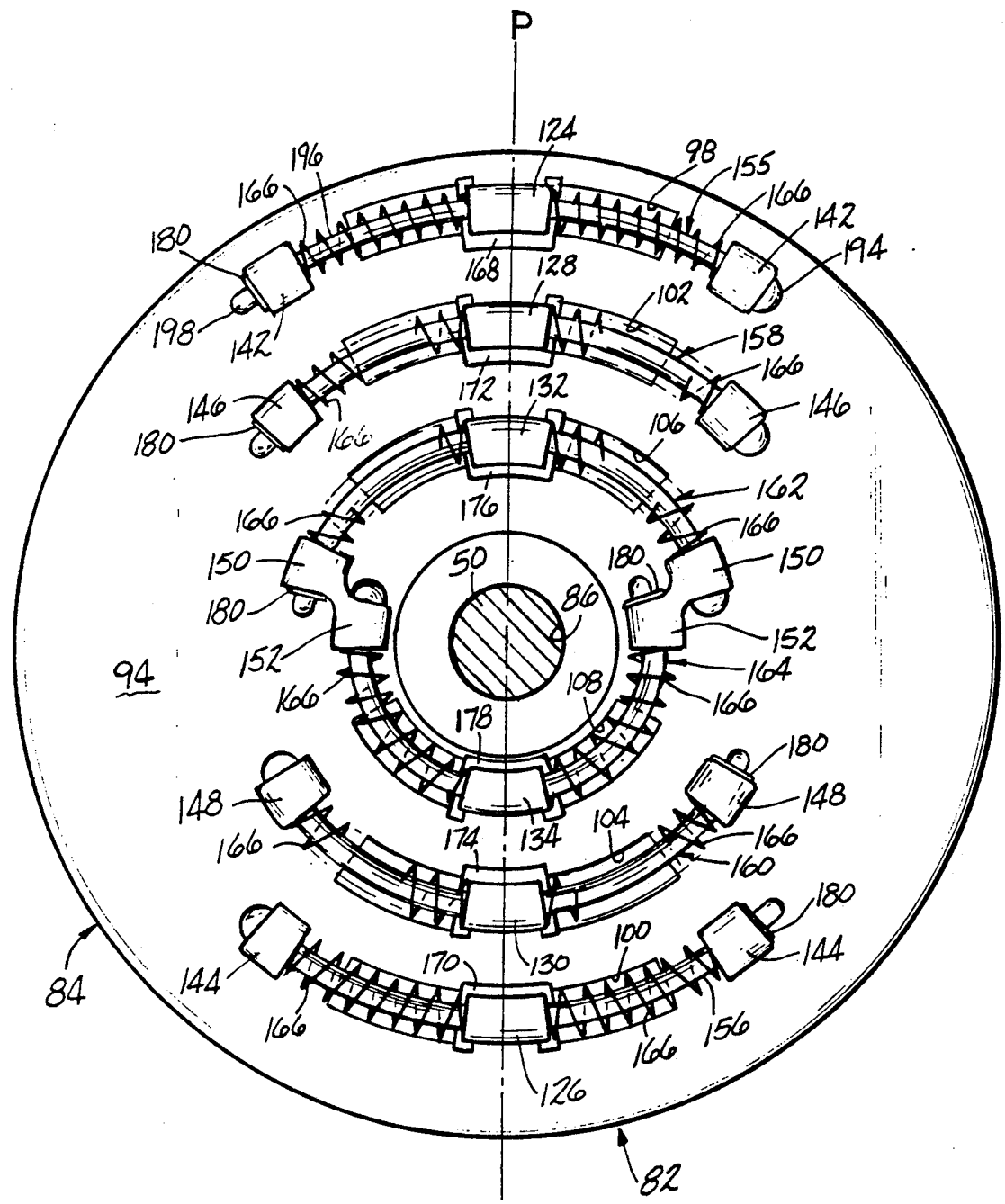
FIG. 7 is a rear view of a back plate assembly which is a component of the transmission and showing guide rods, springs and keys in position.
Figure 8:
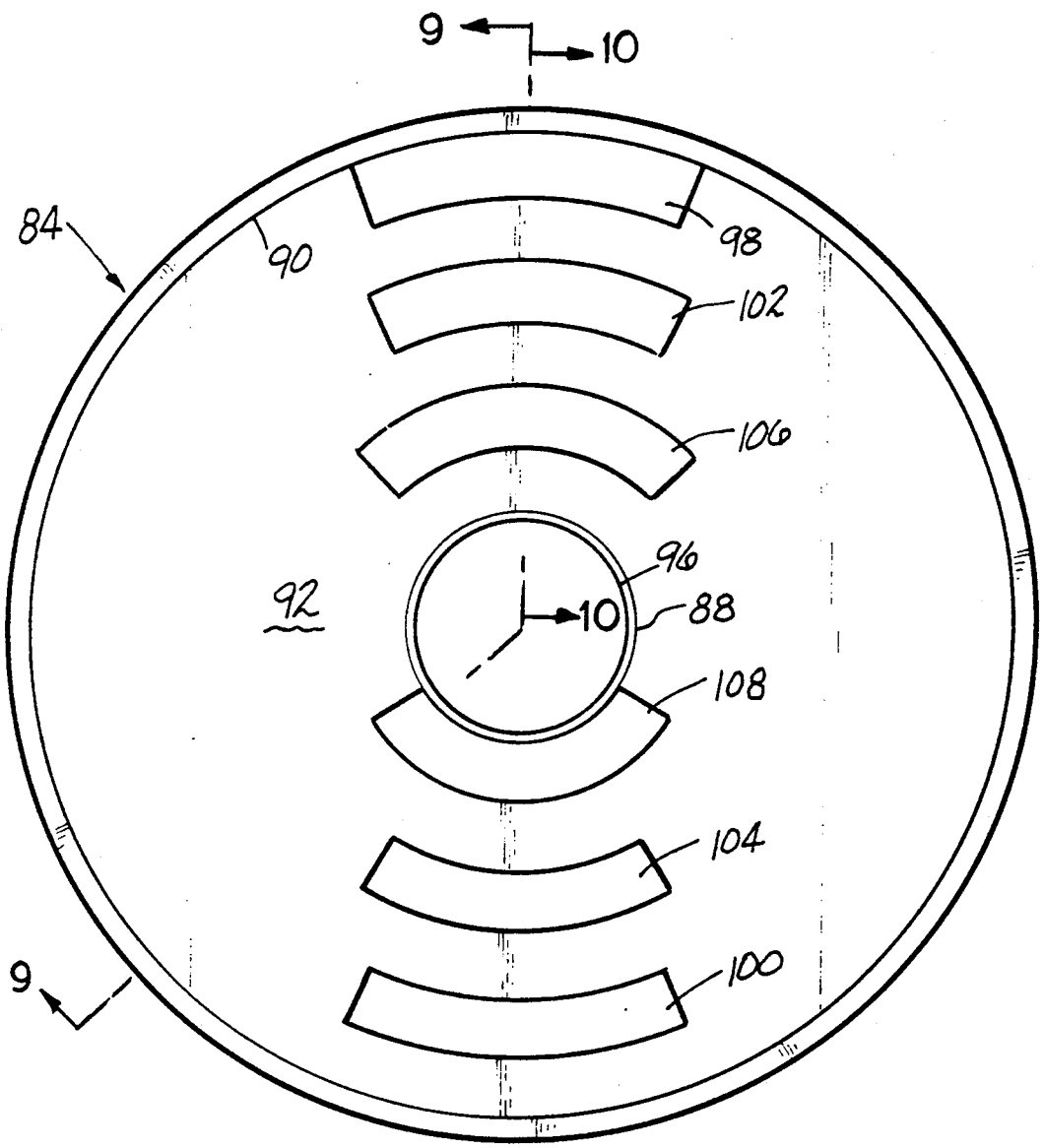
FIG. 8 is a face view of the back plate.

Transmission 60 includes a circular compound face gear assembly 82 which provides the six gears of transmission 60 and which is fixedly mounted on shaft 50 and rotates therewith. Compound face gear assembly 82 appears in plan view in FIG. 2, in edge view in FIG. 6, in rear view in FIG. 7, and in section in FIG. 10, which is taken substantially on line 10—10 of FIG. 8. FIG. 8 shows an element of compound face gear assembly 82, namely a back plate 84, which is also seen in FIGS. 2, 6, 7, 9 and 10. Compound face gear assembly 82 will be described initially with particular reference to FIG. 10, which shows elements of compound face gear assembly 82 in addition to back plate 84. Back plate 84 has a central cylindrical hole 86, which receives bicycle shaft 50 (FIGS. 2 and 7) and is rotatable therewith. Back plate 84 further has inner and outer confronting coaxial cylindrical flange surfaces 88 and 90, respectively, joined by a depressed planar front surface 92 perpendicular to surfaces 88 and 90. Back plate 84 also has a planar back surface 94 parallel to front surface 92. Additionally, back plate 84 has a radially recessed shallow arcuate groove 96 spaced from surface 92 and terminating cylindrical surface 88 throughout its circumference. As best seen in FIGS. 7 and 8, back plate 84 has therethrough six arcuate openings 98, 100, 102, 104, 106 and 108 coaxial with hole 86 and of roughly the same circumferential extent but of differing arcuate extents, varying from a low of about 45° for opening 98 to a high of about 120° for opening 108. The outer arcuate edge of opening 98 coincides with outer cylindrical flange surface 90 and the inner arcuate edge of opening 108 coincides with inner cylindrical flange surface 88. Openings 98, 100, 102, 104, 106 and 108, which are centered on the same diameter, are all of the same radial dimension.

The inner arcuate edge of opening 98 and the outer arcuate edge of opening 100 are the same distance from the axis of back plate 84. The inner arcuate edge of opening 100 and the outer arcuate edge of opening 102 are the same distance from the axis of back plate 84. The inner arcuate edge of opening 104 and the outer arcuate edge of opening 106 are the same distance from the axis of back plate 84. The inner arcuate edge of opening 104 and the outer arcuate edge of opening 106 are the same distance from the axis of back plate 84. The inner arcuate edge of opening 106 and the outer arcuate edge of opening 108 are the same distance from the axis of back plate 84. Furthermore, openings 98, 102, and 106 are centered on the same side of the axis of back plate 84 and openings 100, 104 and 108 are centered on the opposite side of the axis of back plate 84.

Furthermore, the radial distance between openings 98 and 102 and between openings 102 and 106 and between opening 106 and flange surface 88 and between flange surface 90 and opening 100 and between openings 100 and 104 and between openings 104 and 108 is the same.

Figure 10:
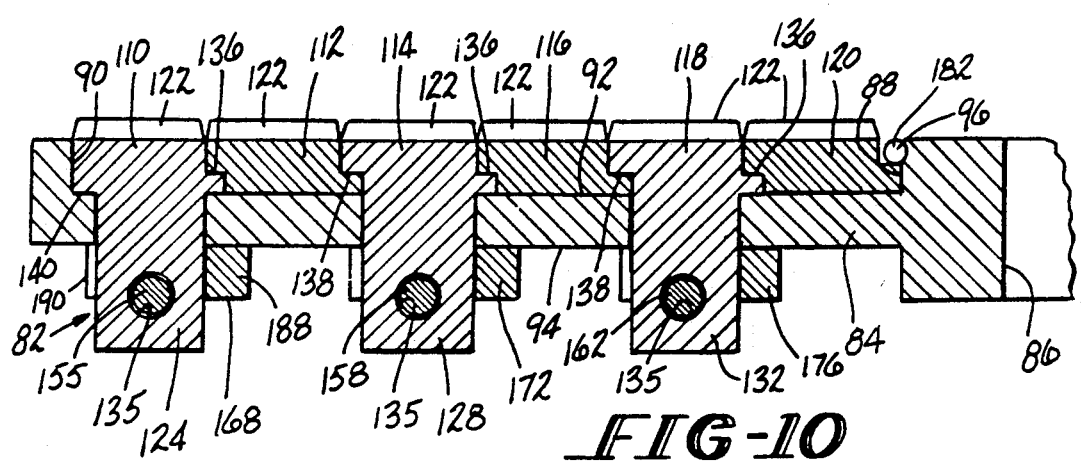
FIG. 10 is a broken away axial sectional view of the back plate taken substantially on line 10—10 of FIG. 8 and also showing gears and certain other parts.

As shown in FIGS. 2 and 10, compound face gear assembly 82 further comprises six contiguous gear rings 110, 112, 114, 116, 118 and 120, each having on one face, radial gear teeth 122 throughout 360° thereof. Teeth 122 are of the same pitch on all rings 110, 112, 114, 116, 118 and 120. Gear rings 110, 112, 114, 116, 118 and 120 provide transmission 60 with first gear, second gear, third gear, fourth gear, fifth gear and sixth gear, respectively. Each gear ring 110, 112, 114, 116, 118 and 120 has a lug on its face opposite the face with teeth 122, these lugs being lugs 124, 126, 128, 130, 132 and 134 for gear rings 110, 112, 114, 116, 118 and 120, respectively, as shown in FIG. 7. Lugs 124, 128 and 132 are also visible in FIG. 10, but lugs 126, 130 and 134 are not, it being noted that lugs 126, 130 and 134 would be seen in FIG. 10 if it were continued on the other side of its axis. Each of gear teeth 122, when viewed in the direction perpendicular to the one face of its particular gear ring, is somewhat elliptical with the direction of elongation oriented radially.

Lugs 124, 126, 128, 130, 132 and 134 are arcuate and are adapted to fit in an protrude through openings 98, 100, 102, 104, 106 and 108, respectively. Each of these lugs is shorter in the circumferential direction than its respective opening, so that each of gear rings 110, 112, 114, 116, 118 and 120 is movable a predetermined distance about the axis of back plate 84, with its lug sliding in its opening.

Furthermore, lugs 124, 126, 128, 130, 132 and 134 have circumferentially extending holes 135 therethrough (FIG. 10), each of which is everywhere equidistant from the center of its respective gear ring.

Except for their differing diameters, gear rings 110, 112, 114, 116, 118 and 120 are shaped substantially alike in axial section. In this connection, reference is made to FIG. 10, from which it will be appreciated that the lugs are all shaped the same, and that the portions of gear rings 112, 114, 116 and 118 on and above surface 92 are the same. These will be described with particular reference to gear ring 114 as it appears in FIG. 10. It will be seen that gear ring 114 has an inwardly projecting flange with an upper floor 136, the flange being of predetermined thickness and having an outwardly projecting ceiling 138 substantially coplanar with floor 136 and of substantially the same radial width. Gear ring 110 is the same as gear ring 114 in this respect except that gear ring 110 has an outwardly projecting ceiling 140 which is positioned below the plane of floor 136 a distance substantially equal to the predetermined flange thickness. Gear ring 120 is the same as gear ring 114 in this respect except that gear ring 120 has an inwardly projecting flange with an upper floor (unnumbered for clarity) such that the last-mentioned flange is somewhat thicker than the corresponding flange of gear ring 114.

Figure 9:
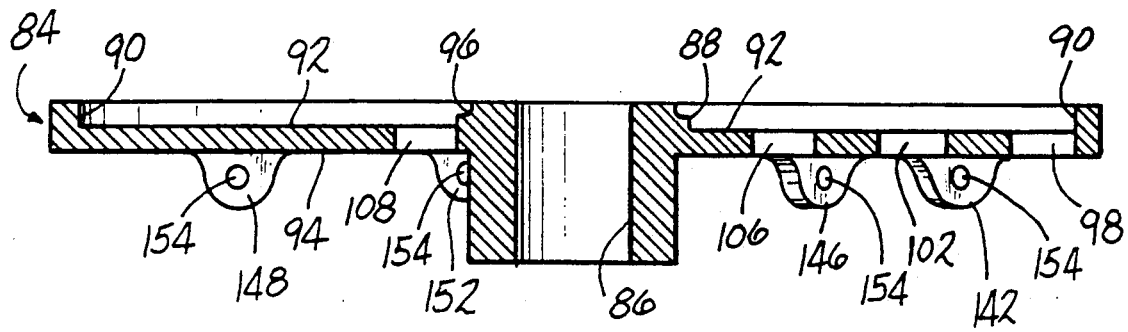
FIG. 9 is a sectional view of line 9—9 of FIG. 8.

As seen in FIGS. 7 and 9, the rear face of back plate 84 is provided with six circumferentially spaced pairs of lugs 142, 144, 146, 148, 150 and 152. The members of each of these pairs of lugs are equally spaced from the axis of cylindrical hole 86 and are also equally spaced on opposite sides of a plane P—P (FIG. 7) which includes the axis of hole 86 and which is common to all pairs of lugs 142, 144, 146, 148, 150 and 152. Each of these lugs is provided with a circumferential circular hole 154 therethrough (see FIG. 9). Lugs 142 are spaced from the axis of hole 86 a distance substantially the same as that of arcuate opening 98 which is circumferentially between lugs 142. Lugs 144 are spaced from the axis of hole 86 a distance substantially the same as that of arcuate opening 100. Lugs 146 are spaced from the axis of hole 86 a distance substantially the same as that of arcuate opening 102. Lugs 148 are spaced from the axis of hole 86 a distance substantially the same as that of arcuate opening 104. Lugs 150 are spaced from the axis of hole 86 a distance substantially the same as that of arcuate opening 106. Lugs 152 are spaced from the axis of hole 86 a distance substantially the same as that of arcuate opening 108.

Additional elements of face gear assembly 82 include spring guide rods 155, 156, 158, 160, 162 and 164 (FIG. 7), twelve coil springs 166 (FIG. 7), keys 168, 170, 172, 174, 176 and 178, which are given different reference numbers because they may differ in their included angles, six grip rings 180 (FIG. 7) and a wire lock ring 182 (FIG. 10) for securely locking face gear assembly 82 together.

The manner of assembling face gear assembly 82 will now be described, with particular reference to FIGS. 7-10 and 13-15, the latter three views also showing further details of some of the parts. The assembly is started with gear ring 110 by inserting its lug 124 through arcuate opening 98. It will be noted from FIGS. 13 and 14 that lug 124 is provided with similar sharp-sided radial slots 184 which are spaced from the annular portion of gear ring 110 a distance substantially equal to the thickness of back pate 84, which is shown in phantom in FIG. 13. Lug 124 also has a circular hole 135 therethrough and extending arcuately from one circumferential end of lug 124 to the other. The lower half of hole 135, i.e., the half adjacent the annular portion of gear ring 110, intersects the bottoms of slots 184, i.e., the portions of slots 184 nearest each other, while the top half of hole 135, i.e., the half remote from the annular portion of gear ring 110, intersects the circumferential ends of lug 124. Lug 124 is typical of lugs 126, 128, 130, 132 and 134.

When lug 124 is properly seated in opening 98, lug 124 and the rest of gear ring 110 will be rotatable with respect to opening 98, limited by the ends of opening 98.

Figures 13, 14:
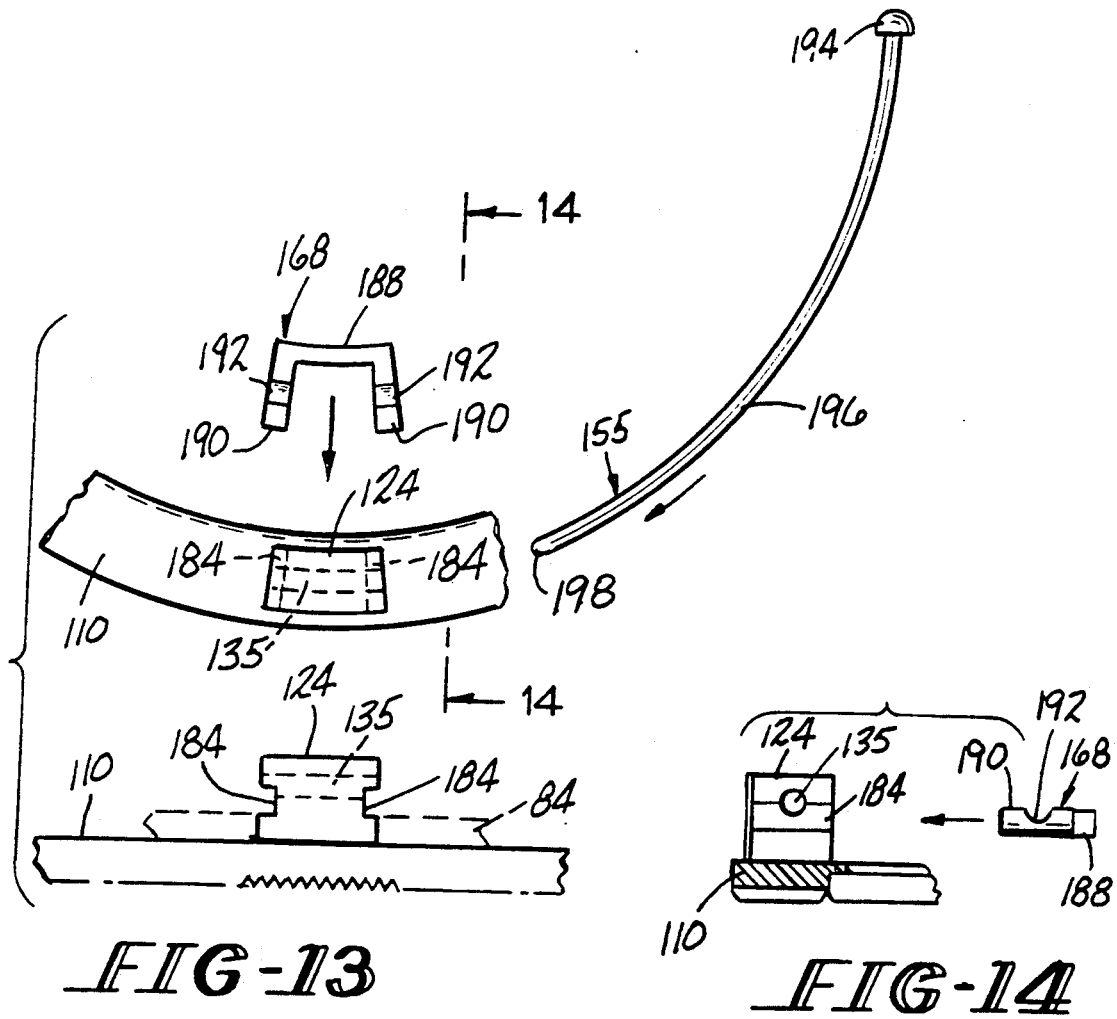
FIG. 13 is an exploded, partially cut away view of a gear ring lug detail for gear six, also showing a spring guide rod therefor, one of two springs therefor and a key therefor.
FIG. 14 is a view taken on line 14—14 of FIG. 13.
Figure 15:
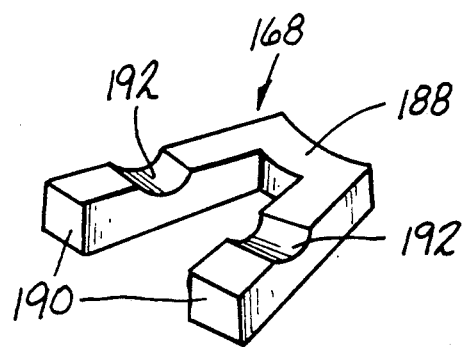
FIG. 15 is an enlarged perspective view of the key of FIGS. 13 and 14.

Next, key 168 is slid into position. Key 168, which is typical of keys 170, 172, 174, 176 and 178, is of one piece construction, having an arcuate body portion 188 and two spaced tine portions 190 extending radially outwardly from opposite ends of body portion 188. Corresponding faces of tine portions 190 have therein semi-cylindrical grooves 192 which are arcuately aligned with each other. Tine portions 190 are shaped, spaced and sized to fit fairly snugly into slots 184 of lug 124, with grooves 192 furnishing the bottom halves of the ends of hole 186, the diameter of grooves 192 being the same as the diameter of hole 186. Key 168 securely locks gear ring 110 in place. FIGS. 13 and 14 depict key 168 about to be assembled with lug 124.

Guide rod 155 is typical of guide rods 156, 158, 160, 162 and 164. Guide rod 155 has a head 194 at one end and an arcuate body 196 extending from head 194 to a free end 198. The length of body 196 is sufficient to extend arcuately from one lug 142 to the other lug 142 and a little therebeyond, while the diameter of body 196 is chosen for sliding fit within hole 135 (FIGS. 10, 13 and 14) of lug 124 as augmented by grooves 192 of key 168 and within holes 154 of lugs 142.

Body 196 of guide rod 155 is inserted, free end 198 first, through hole 154 of one lug 142. Then, a first of the twelve springs 166 is passed over free end 198 and compressed on body 196. With key 168 in place on lug 124 as aforesaid, free end 198 is then passed through hole 135 of lug 124 as augmented by grooves 192 of key 168. A second of the twelve springs 166 is passed over free end 198 and compressed on body 196. Free end 198 is then passed through hole 154 of the other lug 142. A first grip ring 180 is installed on body 196 of rod 155, over free end 198 thereof, thus to lock gear ring 110 in place.

Next, gear ring 112 is installed in similar fashion, followed in order and in similar fashion by gear ring 114, gear ring 116, gear ring 118 and gear ring 120, with ceiling 138 of gear ring 112 overlapping floor 136 of gear ring 110, ceiling 138 of gear ring 114 overlapping floor 136 of gear ring 112, ceiling 138 of gear ring 116 overlapping floor 136 of gear ring 114, ceiling 138 of gear ring 118 overlapping floor 136 of gear ring 116 and ceiling 138 of gear ring 120 overlapping floor 136 of gear ring 118. Also, ceiling 140 of gear ring 110 rests on front surface 92 of back plate 84, as does the entire bottom surface of gear ring 120.

Finally, wire lock ring 182 is installed in groove 96, securely to lock the entire assembly together.

Gear rings 110, 112, 114, 116, 118 and 120 are shown in their neutral positions in FIG. 7, being held that way by substantially uniform pressure exerted by a pair of springs 166 on both sides of each of lugs 124, 126, 128, 130, 132 and 134. Gear rings 110, 112, 114, 116, 118 and 120 may be moved a sufficient distance in either circumferential direction to allow shifting from one gear to an adjacent gear as will now be described, with particular reference to FIGS. 2, 6, 11 and 12.

Transmission 60 further includes a shift rod 200 which sees through a guide hole 201 through a flange 202 which is integral with cover member 68 and projects inwardly therefrom within chamber 70 alongside shaft 50. Shift rod 200 is slidably movable in guide hole 201, relative to flange 202. Transmission 60 further includes a yoke 204, best seen in FIGS. 2, 11 and 12 but also being visible but unnumbered in FIG. 6. Yoke 204 is securely fastened to shift rod 200 and has a cylindrical hole 206 therethrough through which shift rod 200 passes. Yoke 204 also has a smaller diameter cylindrical hole 208 therethrough. The axes of holes 206 and 208 intersect each other at right angles. Shift rod 200 has a diametrical hole 210 therethrough of the same diameter as hole 208. Hole 208, as clearly seen in FIG. 12, exists in two equal halves, interrupted by hole 206. Yoke 204 is assembled with shift rod 200 by a drive pin 212 driven into one half of hole 208, hole 210 and the other half of hole 208. Thus, yoke 204 is immobilized relative to shift rod 200. Yoke 204 also has two downwardly projecting arcuate, tine-like members 214 which are mirror images of each other and provide equal parts of an internal semi-cylindrical surface 216 the axis of which is parallel to the axis of hole 206. Yoke 204 is symmetrical with respect to a plane containing the axes of hole 206 and cylindrical surface 216, and has like parallel face surfaces 218 and 220.

Transmission 60 further includes a spline shaft 222 one end of which is bearinged in flange 202 and the other end of which is bearinged in bearing support 224, which, like flange 202, projects inwardly from cover member 68 within chamber 70. Shift rod 200 also extends through a hole 226 (FIG. 6) through bearing support 224. From hole 226, shift rod 200 extends to a first end 228. Shift rod 200 also extends, on the side of flange 202 opposite rear end 228, to a second end 230 which is pivotally connected as indicated at 232 to an end of a link 234. The other end of link 234 is pivotally connected as indicated at 236 to an end of an inner actuator 238 which passes lengthwise through and is bearinged in a cylindrical support member 240 which is integral with deep body member 66 and passes through the wall thereof to end 242 outside housing 62. The axis of support member 240 is parallel to the axes of shafts 50 and 72. Inner actuator 238 may be of one-piece or multi-piece construction.

An external actuator 244 (FIGS. 1 and 6) is integrally connected to inner actuator 238 adjacent its end 242 outside housing 62. When external actuator 244 is rotated in a clockwise direction (as seen in FIG. 1) about the axis of cylindrical support member 240, shift rod 200 will be moved to the left as viewed in FIGS. 2 and 6, and when external actuator 244 is rotated in a counter-clockwise direction (as seen in FIG. 1) about the axis of cylindrical support member 240, shift rod 200 will be moved to the right as viewed in FIGS. 2 and 6.

Shift rod 200 also has, adjacent free end 228 and on the side of shift rod 200 confronting cover member 68, six evenly spaced like detents 246, detents 246 being spaced apart a distance substantially the same as the radial distance between gear teeth 122 on adjacent gear rings 110, 112, 114, 116, 118 and 120. Within an internally threaded bore extending from the exterior of cover member 68 into bearing support 224 is a detent ball 248 (FIG. 6) positioned to engage at any time a selected one of detents 246. Ball 248 is engaged and held impositively against shift rod 200 by a coil spring 250 which is in turn held in place by a set screw 252 in threaded engagement with the threaded bore.

Figures 11, 12:
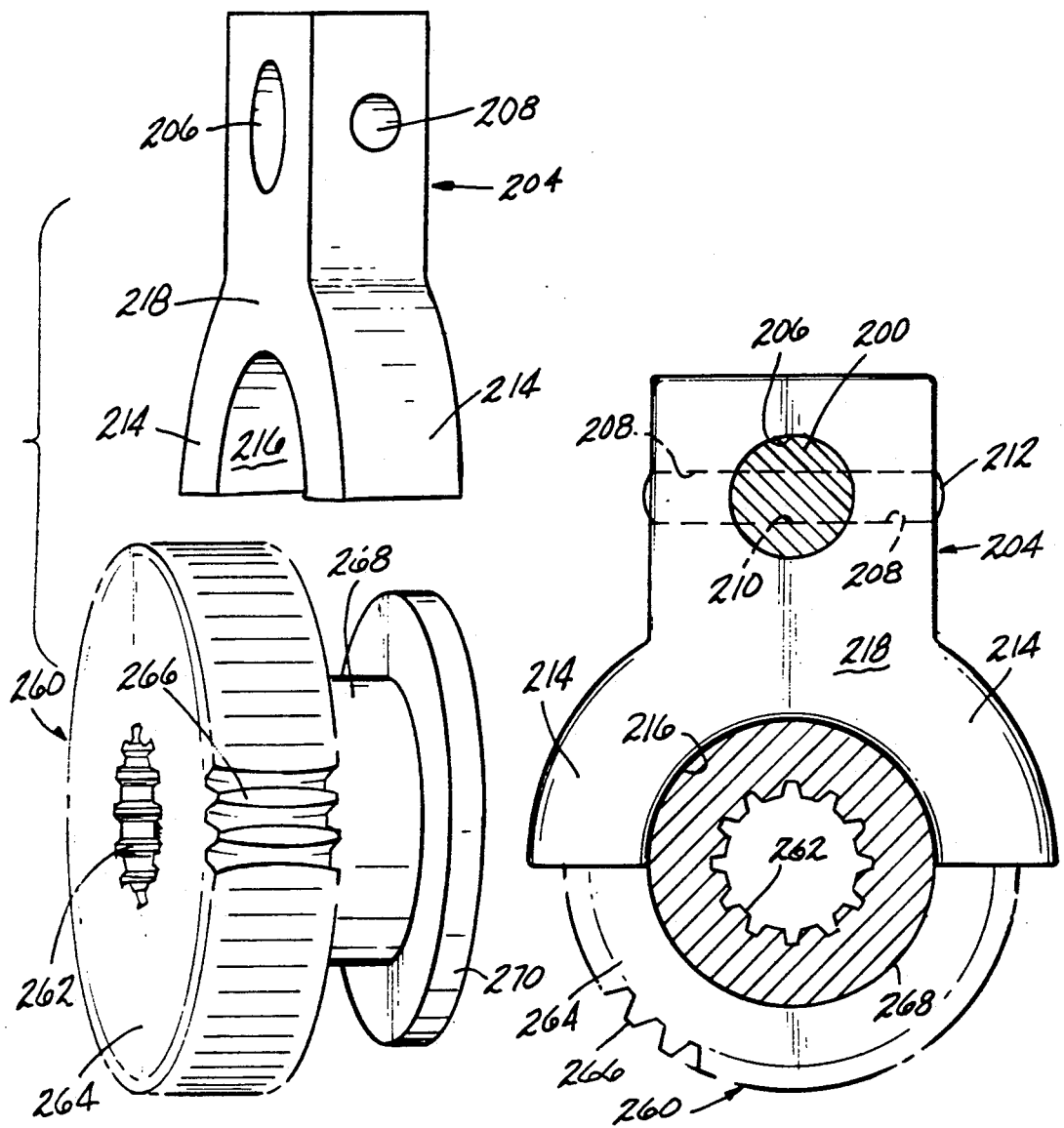
FIG. 11 is a perspective broken away view of the pinion and the yoke.
FIG. 12 is an elevational view showing the pinion and the yoke assembled.

Transmission 60 further includes a sliding pinion 260 (FIGS. 2 and 6 and best seen in FIGS. 11 and 12) having an axial, internally-splined bore 262 extending from one axial face of pinion 260 to the other. Splined bore 262 engages the splines of spline shaft 222, in driving engagement therewith. Pinion 260 has three coaxial sections between its axial faces, including a first section 264 of largest outside diameter and having external axial gear teeth 266 evenly spaced circumferentially completely therearound, a second section or groove 268 of smallest outside diameter axially adjacent section 264 and a third section 270 of outside diameter intermediate the outside diameters of sections 264 and 268 and axially adjacent groove 268 which is axially between sections 264 and 270. External gear teeth 266 are sized, shaped, spaced and positioned to mesh with gear teeth 122 on any selected one of gear rings 110, 112, 114, 116, 118 and 120. Like gear teeth 122, each of gear teeth 266, when viewed in the direction toward the axis of pinion 260, is somewhat elliptical with the direction of elongation oriented parallel to the axis of pinion 260, as shown in FIG. 11.

Yoke 204 is, as aforesaid, immobilized with respect to shift rod 200. Further, arcuate, tine-like members 214 extend into the axial space between sections 264 and 270 of pinion 260 with semi-cylindrical surface 216 in groove 268 of sliding pinion 260. In result, sliding pinion 260 slides along spline shaft 222 in response to movement of yoke 204, which, as aforesaid, moves with shift rod 200. Not all of the parts of sliding pinion 260 are numbered in all of the views depicting same.

Transmission 60 further includes meshing bevel gears 272 and 274 (FIGS. 2 and 6) which are identical. Bevel gear 272 is mounted on shaft 72 and rotates therewith, and bevel gear 274 is mounted on spline shaft 222 and rotates therewith.

In operation, rotation is transmitted from pedals 52 to shaft 50, from shaft 50 to face gear assembly 82, from face gear assembly 82 to sliding pinion 260, from sliding pinion 260 to spline shaft 222, from spline shaft 222 to bevel gear 274, from bevel gear 274 to bevel gear 272, from bevel gear 272 to shaft 72, from shaft 72 to sprocket 54, from sprocket 54 to chain 56 and from chain 56 to rear wheel 40. The gear, and hence pedaling difficulty, is determined by which one of gear rings 110, 112, 114, 116, 118 and 120 is engaged by gear teeth 266 of sliding pinion 260.

To effect shifting, shift rod 200 is moved longitudinally, through the action of external actuator 244, internal actuator 238 and link 234, thus moving yoke 204 and sliding pinion 260 to achieve engagement of gear teeth 266 and gear teeth 122 of the desired one of gear rings 110, 112, 114, 116, 118 and 120. More specifically, when external actuator 244 moves in the clockwise direction as seen in FIG. 1, the number of the engaged gear ring goes down. The shifting action will now be described in greater detail.

No matter which one of gear rings 110, 112, 114, 116, 118 and 120 is engaged by sliding pinion 260, every one of gear rings 110, 112, 114, 116, 118 and 120 will rotate about the axis of shaft 50 as long as shaft 50 is being rotated. However, the so engaged one of gear rings 110, 112, 114, 116, 118 and 120 will be in a circumferentially advanced, out-of-neutral position relative to the other five gear rings which are in neutral position, and the lug of the engaged gear ring will be out of alignment with the lugs of the other gear rings. Thus, during shifting, the engagement of sliding pinion 260 shifts from one moving gear ring to an adjacent moving gear ring. The fact that the gear rings are resiliently relatively movable aids the transfer of sliding pinion 260 from engagement with gear teeth 122 of one gear ring to gear teeth 122 of an adjacent gear ring.

If the gear rings were not circumferentially movable relative to each other, they would lock solid as soon as sliding pinion 260 attempted to engage an adjacent gear ring.

The somewhat elliptical shape of gear teeth 122 and gear teeth 266 greatly facilitates the engagement of these gear teeth with each other, and also serves to overcome the effect of progressively smaller diameters of the gear rings. The shifting of pinion 260 from engagement with one gear ring to engagement with another gear ring can be felt by an operator. Also, to help overcome the differential of rotation due to progressively smaller or larger gear rings, each successive gear ring can move slightly with its rotation while pinion 260 is momentarily engaged with two adjacent gear rings at once. This avoids the need for the operator to stop pedaling during shifting. A slight lessening of pressure will suffice, although shifting can be effected during a cessation of pedaling.

Shift mechanism 64 will now be described, with reference to FIGS. 1, 3, 3A, 4 and 5. FIG. 1 shows shift mechanism 64 in the fifth speed position, whereas FIG. 3 shows shift mechanism 64 in the sixth speed position.

Shift mechanism 64 includes a shift segment plate 280 (FIGS. 1 and 3) which is suitably mounted on bicycle 20. More particularly, shift segment plate 280 is secured to horizontal frame member 22 and to diagonal frame member 28 adjacent front stem 26 and is stationary relative to those parts. Shift segment plate 280 has a central cutout portion 282 best seen in FIG. 3.

Shift mechanism 64 also includes a shift arm 284 (FIGS. 1, 3, 4 and 5) which is pivotally mounted with respect to shift segment plate 280 at aligned pivot holes 286 and 288, respectively, by means of a shift arm pivot bolt 290, a washer 292 and a nut 294, all as best seen in FIG. 4. Pivot holes 286 and 288 and bolt 290 define a main or fixed axis of shift arm 284. Shift arm 284 extends from hole 286 across cutout portion 282 and thence beyond shift segment plate 280.

Central cutout portion 282 of shift segment plate 280 is in part defined by an arcuate surface 296 about 60 degrees in arcuate extent and centered on the axis of bolt 290 (FIG. 3). Arcuate surface 296 is provided with five like barrels 298 which protrude equally from arcuate surface 296 toward the axis of bolt 290 and are spaced equally from each other. Barrels 298 have free inner ends 299 which define a circle centered on the axis of bolt 290. The two extreme barrels 298 are also equally spaced from the two extremeties of arcuate surface 296. Each barrel 298 has a rounded crest 300 which projects upwardly from the upper surface of shift segment plate 280, as best seen in FIG. 3A.

As will appear more clearly hereinafter, the space between the lowermost barrel 298 (as seen in FIG. 3) and the adjacent arcuate end of arcuate surface 296 represents the first speed position, and the space between the uppermost barrel 298 (as seen in FIG. 3) and the adjacent arcuate end of arcuate surface 296 represents the sixth speed position. Further, the spaces between adjacent barrels 298 represent in order the second through the fifth speed positions as one proceeds from the lowermost barrel 298 to the uppermost barrel 298.

As seen in FIG. 5, shift arm 284 includes, at the end thereof remote from hole 286, which end is beyond shift segment plate 280, a hand grip portion 302. Between hand grip portion 302 and hole 286, shift arm 284 includes aligned keyholes 304, 306, 308 and 310 therethrough, keyhole 304 being a double keyhole and keyholes 306, 308 and 310 being single keyholes. Keyhole 304 is adjacent hand grip portion 302, keyhole 310 is adjacent hole 286, keyhole 306 is between keyhole 304 and keyhole 310, and keyhole 308 is between keyhole 306 and keyhole 310.

Shift arm 284 also includes a sidewardly bulged portion 312 adjacent keyhole 304 and a sidewardly bulged portion 314 adjacent hole 286. Portions 312 and 314 are located on the same side of shift arm 281 and portion 312 has therethrough a larger hole 316 and a smaller hole 318. Portion 314 has therethrough a hole 320 spaced a predetermined distance from hole 286. The axes of holes 316, 318 and 320 are parallel to the main or fixed axis defined by holes 286 and 288 and bolt 290, and may be deemed additional axes.

Shift mechanism 64 further includes a shift lever 322 (FIGS. 1 and 3), a spring support 324 (FIGS. 3 and 4), a pawl 326 having a trailing end 327 (FIGS. 3 and 4), a pawl spring 328 (FIGS. 3 and 4) which is a coil spring under compression with its ends in blind confronting holes 330 and 332 in spring support 324 and pawl 236, respectively, a lever support 334 a pusher block 336 having a trailing end 337, a pusher 338, a pusher spring 340, two pusher block springs 342 which are coil springs each of which is under compression in aligned behind holes 344 and 346 in lever support 334 and pusher block 336, respectively. Only one set of blind holes 344 and 346 is visible, in FIG. 4. Trailing end 327 of pawl 326 is of width sufficiently narrow to fit between free ends 299 of barrels 298 and between free ends 299 of extreme barrels 298 and the extremities of arcuate surface 296.

Pusher 338 is mounted for limited rotation about a pusher pivot pin 348 which is mounted in aligned holes in pusher block 336.

Shift lever 322 is pivotally mounted about a pivot pin 350 which passes through a hole through shift lever 322 and through hole 316 in shift arm 284. Shift lever 322 also has an upstanding forwardly facing surface 352 which passes through the axis of pivot pin 350 and which engages trailing end 337 of pusher block 336. Shift lever 322 further has an upwardly facing surface 354 substantially at right angles to surface 352, and a pin 356 is set in hole 320 of shift arm 284 and projects laterally therefrom. Pin 356 is a stop for shift lever 322. More particularly, pin or stop 356 serves to limit rotation of shift lever 322 in the counterclockwise direction about pivot pin 350 as seen in FIG. 3 by engaging upwardly facing surface 354. Finally, shift mechanism 64 includes a shift rod 358 (FIGS. 1 and 3) which is pivotally connected at its upper end to a pivot pin 360 secured in hole 320 of shift arm 284 and is connectible at its lower end to external actuator 244 at 362. Thus, at its upper end shift rod 358 is pivotally connected to shift arm 284 at the additional axis provided by hole 320.

It is evident that as shift rod 358 is moved longitudinally upwardly, external actuator 244 will be moved clockwise as viewed in FIG. 1, thus lowering the number of the engaged gear, as stated above.

The manner of assembly of shift mechanism 64 will now be described further, with particular reference to FIG. 4. Spring support 324 has a bottom lug 364 which is inserted into keyhole 310 in shift arm 284 with blind spring hole 332 facing hand grip portion 302, and is then slid all the way to the right as seen in FIG. 4. Pawl 326 has bottom lugs 366 and 368 which are inserted into keyholes 310 and 308, with blind spring hole 330 confronting blind spring hole 332 of spring support 324, and with pawl spring 328 captured in holes 330 and 332.

Shift arm 284 is now assembled with shift segment plate 280 by compressing spring 328 with pawl 326, engaging bolt 290 in holes 286 and 288 and securing bolt 290 with washer 292 and nut 294. Pawl 326 is now released, allowing it to engage in any of the six shift positions.

Lever support 334 has a bottom lug 370 and forwardly facing lips 372. Lug 370 is now engaged in keyhole 306 with its blind holes 344 facing away from pawl 326. Lever support 334 is then slid along keyhole 306 until lips 372 come into overlapping engagement with shift segment plate 280, thus locking shift arm 284 firmly against shift segment plate 280.

Pusher 338 is now assembled to pusher block 336 by first inserting pusher spring 340 into an upwardly facing cavity 372 in pusher block 336 and then inserting pusher 338 into pusher block 336, compressing pusher spring 340 until pusher pivot pin 348 can be inserted as shown in FIG. 4 and described above.

Pusher block 336 has bottom lugs 374, and the assembly is now mounted to shift arm 284 by inserting lugs 374 into double keyhole 304 and inserting pusher block springs 342 into blind holes 344 and 346.

Shift lever 322 is now assembled to shift arm 284 in the manner described above. Surface 352 engages the rear end of pusher block 336, so that springs 342 urge pusher block 336 against surface 352 and surface 354 against pin 356.

It should also be mentioned that pusher 338 has a forward end 376 which normally, under the urging of pusher spring 340, urges forward end into a gap between pawl 326 and lever support 334.

In operation, assume that shift mechanism 64 is in the sixth position, as shown in FIG. 3. Shift rod 358 will be in position whereby transmission 60 will be in the sixth speed gear as shown in FIG. 6. Assume further that it is desired to shift to the fifth speed gear. This shift is accomplished by grasping hand grip portion 302 of shift arm 284 and shift lever 322 and squeezing these parts together. This moves forwardly facing surface 352 of shift lever 322 forwardly against trailing end 337 of pusher block 336, compressing lever support 334 and pusher block 336, compressing springs 342 and moving pusher 338 forward, causing forward end 376 of pusher 338 to move pawl 326 forward out of engagement with the uppermost one of barrels 298. That is, pawl 326 will be moved forward so that trailing end 327 of pawl 326 will be within the circle defined by inner ends 299 of barrels 298. This allows shift arm 284 to be moved downward, to shift to the fifth position. As this downward movement of shift arm 284 occurs, forward end 376 of pusher 338 rides up over crest 300 of uppermost barrel 298 and thus becomes disengaged from trailing end 327 of pawl 326 which now presses against the inner end 299 and rides on top thereof in overlapping engagement with uppermost barrel 298. As shift arm 284 is moved downward, trailing end 327 of pawl 326 passes from engagement with inner end 299 of uppermost barrel 298 and is forced by pawl spring 328 to engage between uppermost barrel 298 and the next lower barrel 298. This is the fifth speed, and shift arm 284 cannot be moved to another speed position (in this case either the fourth speed position or back to the sixth speed position) until shift lever 322 is operated again, i.e., until shift arm 284 and shift lever 322 are released to permit springs 342 to retract pusher 338 relative to pawl 326 so that the overlapping engagement of pawl 326 and pusher 338 is ended and spring 340 reestablishes the original abutting relationship of ends 327 and 376. This permits a new shifting operation to take place when shift arm 284 and shift lever 322 are once again squeezed together. This is a safety feature which prevents damage to the gears by jamming.

It is evident that the invention attains the stated objects and advantages and others.

The disclosed details are exemplary only and are not to be taken as limitations on the invention except as those details are included in the appended claims.

What is claimed is:

1. A shift mechanism for manipulating an actuator of a transmission having a second gear between a first gear and a third gear to shift the transmission from any of the gears to an adjacent gear, said shift mechanism comprising a fixedly mountable shift segment plate, a shift arm pivotally mounted about a main axis which is fixed with respect to said shift segment plate and providing an additional axis parallel to said main axis, a shift rod pivotally connectible to the transmission actuator and pivotally connected to said shift arm at said additional axis, said shift segment plate having an arcuate surface confronting and coaxial with said main axis, a plurality of like barrels spaced from each other and having free ends projecting toward said main axis from said arcuate surface and crests projecting upwardly from said shift segment plate, said barrels including one said barrel which is adjacent and spaced from one end of said arcuate surface and another said barrel which is adjacent and spaced from the other end of said arcuate surface, whereby each said barrel has a portion of said arcuate surface on each side thereof, said shift mechanism further comprising a shift lever pivotally mounted with respect to said shift arm and having a forwardly facing surface overlying said shift arm and generally facing said shift segment plate, a pawl mounted for limited movement lengthwise of said shift arm and having a trailing end of width sufficiently narrow to fit between said free ends of adjacent ones of said barrels and between said free end of said barrel which is adjacent said one end of said arcuate surface and between said free end of said barrel which is adjacent said other end of said arcuate surface, spring means urging said pawl away from said main axis, a pusher block mounted for limited movement lengthwise of said shift arm and having a trailing end, pusher block resilient means urging said pusher block against said forwardly facing surface of said shift lever, a pusher carried by said pusher block and movable therewith lengthwise of said shift arm and having a forward end confronting said main axis and engageable with said pawl, said pusher being pivotally mounted to said pusher block about a pusher axis perpendicular to said main axis, and resilient means urging rotation of said pusher about said pusher axis in the direction urging said forward end of said pusher toward said shift segment plate, said forward end of said pusher being engageable in abutting fashion with said trailing end of said pawl and with said shift segment plate and liftable away from said shift segment plate by passing over said crest of any said barrel during shifting and into overlapping engagement with said trailing end of said pawl, permitting said trailing end of said pawl to engage said arcuate surface and preventing further shifting until said shift lever is released to allow said pusher block resilient means to push said pusher block and said pusher away from said main axis to move said forward end of said pusher past said trailing end of said pawl and said resilient means which urges rotation of said pusher to move said forward end of said pusher into engagement with said shift segment plate and abutting relationship with said trailing end of said pawl.

2. A shift mechanism according to claim 1 including five said barrels.

* * * * *